Dec. 23, 1952 J. P. KNOX 2,622,361
FISH LURE
Filed May 9, 1951

INVENTOR.
JAMES P. KNOX
BY Frank Toohey
HIS ATTORNEY

Patented Dec. 23, 1952

2,622,361

UNITED STATES PATENT OFFICE 2,622,361

FISH LURE

James P. Knox, Allston, Mass.

Application May 9, 1951, Serial No. 225,385

1 Claim. (Cl. 43—42.06)

My present invention relates to artificial fishing baits or lures, and more particularly to an artificial fishing bait of the plug type.

An object of my invention is to provide an artificial fishing bait having means incorporated therein which will cause such fishing bait to move erratically in and through the water as it is drawn onward by the usual attached line.

Another object is to provide a fish lure which will simulate the appearance and movement of live bait. Other objects and novel features of the construction and arrangement of parts comprising the device will appear as the description of the invention progresses.

Figure 1:
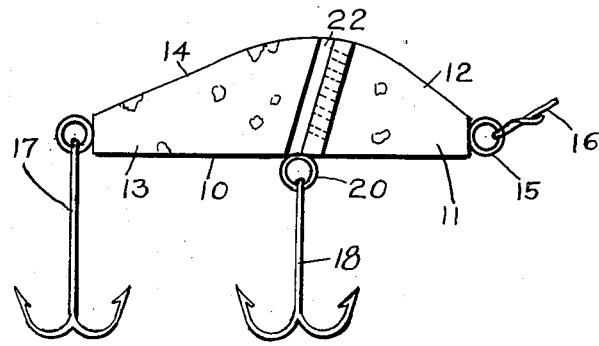
Figure 1 is a side elevation of a fish lure embodying my invention.

Referring to the drawing, 10 designates the body of the fish lure, said body being elongated, as shown, and with the forward end 11 bluntly pointed, and with the upper surface inclined rearwardly and upwardly as indicated by the numeral 12.

The rear portion 13 of the body 10 is tapered from its junction with the forward end 11, rearwardly, and the upper surface of the rear portion 13 slopes downwardly as indicated by the reference numeral 14.

The front portion 11 has attached thereto, at its front end, a screw eye 15 to which may be attached the end of a line 16. Also the rear portion 13 has attached thereto a screw eye 16 on which is attached the fish hook 17. A fish hook 18 is also attached to the under face of the body 10 by means of a screw eye 20.

Figure 2:
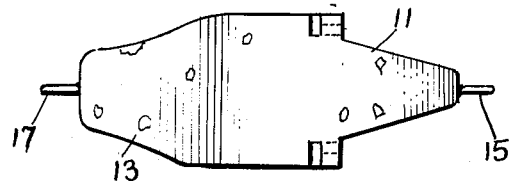
Figure 2 is a plan view.
Figure 3:
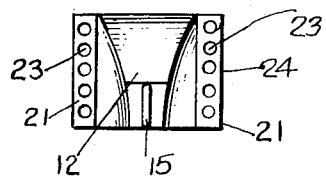
Figure 3 is a front elevational view with the hooks and hook eyes removed.

By reference to Figs. 2 and 3, it will be noted that the width of the forward portion 12 is less than the width of the rear portion 13 thus providing an abutment 21 on either side of the rear of the forward portion 12. The forward face of the abutments 21 slopes rearwardly and downwardly, as clearly shown in Fig. 1, so that as the the lure is shoved forwardly by means of the line 16, there is a tendency on the part of the lure to lift upwardly and thus cause a movement that simulates the movement of a fish.

To accentuate this lifting movement I have provided, in the rear portion 13 of the lure and spaced apart from but parallel to the face of the abutments 21, the channels 22. These channels 22 are connected to the face of the abutments 21 by a plurality of perforations 23 or by a slot 24, as desired. Such a structure appears to accentuate the lifting movement of the lure, and results in a lively and killing lure.

What I claim is:

A fishing lure comprising an elongated hook carrying body having the front end provided with a line attaching eye at the forward face thereof, said front end being of less cross-sectional area than the mean cross-sectional area of the body to thereby define an abutment on each side of the forward end of the body, said abutment lying at a rearwardly sloping angle from the top downwardly of the body, channels formed in each side of the main portion of the body and lying parallel to the sloping abutment, and passages extending through the face of the abutment and communicating with the channels to permit flow of liquid into said channels as the lure is drawn through the water.

JAMES P. KNOX.

REFERENCES CITED

The following references are of record in the file of this patent:

UNITED STATES PATENTS

| Number | Name | Date |
| --- | --- | --- |
| 1,490,161 | Dickman | Apr. 15, 1924 |
| 1,854,696 | Herington | Apr. 19, 1932 |